US012624779B2

(12) United States Patent
Simonsen

(10) Patent No.: US 12,624,779 B2
(45) Date of Patent: May 12, 2026

(54) PIPE COUPLING FOR CONNECTING CIRCULAR ELEMENTS

(71) Applicant: AVK HOLDING A/S, Galten (DK)

(72) Inventor: Christian Henrik Simonsen, Ulstrup (DK)

(73) Assignee: AVK HOLDING A/S, Galten (DK)

( * ) Notice: Subject to any disclaimer, the term of this patent is extended or adjusted under 35 U.S.C. 154(b) by 0 days.

(21) Appl. No.: 18/858,813

(22) PCT Filed: Apr. 14, 2023

(86) PCT No.: PCT/DK2023/050095
§ 371 (c)(1),
(2) Date: Oct. 22, 2024

(87) PCT Pub. No.: WO2023/202754
PCT Pub. Date: Oct. 26, 2023

(65) Prior Publication Data
US 2025/0277549 A1 Sep. 4, 2025

(30) Foreign Application Priority Data

Apr. 22, 2022 (DK) .............................. PA202270211

(51) Int. Cl.
*F16L 21/06* (2006.01)
*F16L 21/08* (2006.01)
(52) U.S. Cl.
CPC ............. *F16L 21/065* (2013.01); *F16L 21/08* (2013.01)
(58) Field of Classification Search
CPC ....... F16L 21/065; F16L 21/08; F16L 21/007; F16L 21/03; F16L 17/04
See application file for complete search history.

(56) References Cited

U.S. PATENT DOCUMENTS

| | | | |
|---|---|---|---|
| 1,930,194 A | | 10/1933 | Dillon, V |
| 2,473,046 A | * | 6/1949 | Adams, Jr. .............. F16L 17/04 |
| | | | 285/104 |
| 7,837,239 B2 | | 11/2010 | Krausz et al. |
| 10,364,923 B2 | | 7/2019 | Chiproot |
| 2017/0343142 A1 | | 11/2017 | Kim |
| 2020/0025316 A1 | | 1/2020 | Chiproot |
| 2022/0057028 A1 | | 2/2022 | Kennedy |

FOREIGN PATENT DOCUMENTS

| | | |
|---|---|---|
| EP | 2905522 A1 | 8/2015 |
| WO | 2018186651 A1 | 10/2018 |
| WO | 2019221439 A1 | 11/2019 |

OTHER PUBLICATIONS

International Search Report for corresponding application filed Apr. 14, 2023; Mail date Jul. 7, 2023.

* cited by examiner

*Primary Examiner* — Aaron M Dunwoody
(74) *Attorney, Agent, or Firm* — CANTOR COLBURN LLP

(57) ABSTRACT

A pipe coupling for connecting circular elements, including a clamping ring having an inner annular concave groove and at least one fastener arranged to contract the clamping ring, where the pipe coupling further includes a plurality of grip elements each having a plurality of gripping protrusions on an inwards facing surface and a convex protrusion on an opposite outwards facing surface, where the convex protrusion of the plurality of grip elements is arranged in the inner annular concave groove of the clamping ring so that the plurality of grip elements may tilt in relation to the clamping ring.

9 Claims, 3 Drawing Sheets

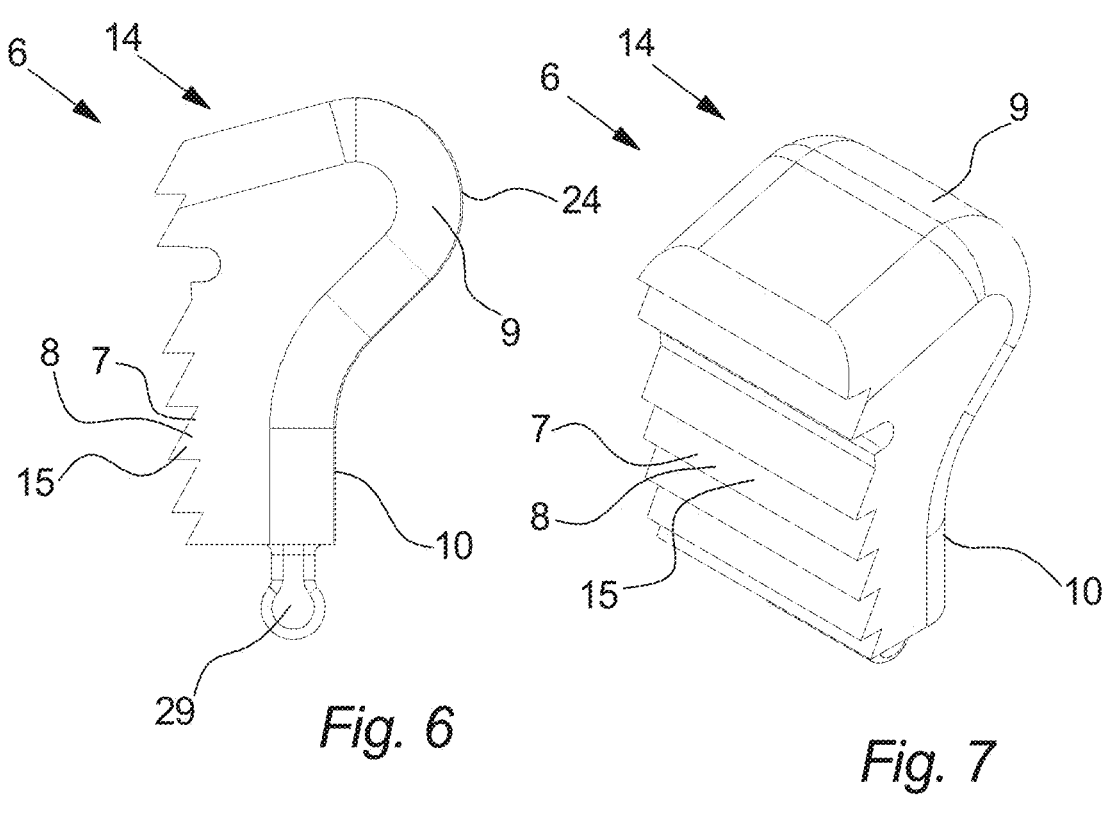
Fig. 6
Fig. 7
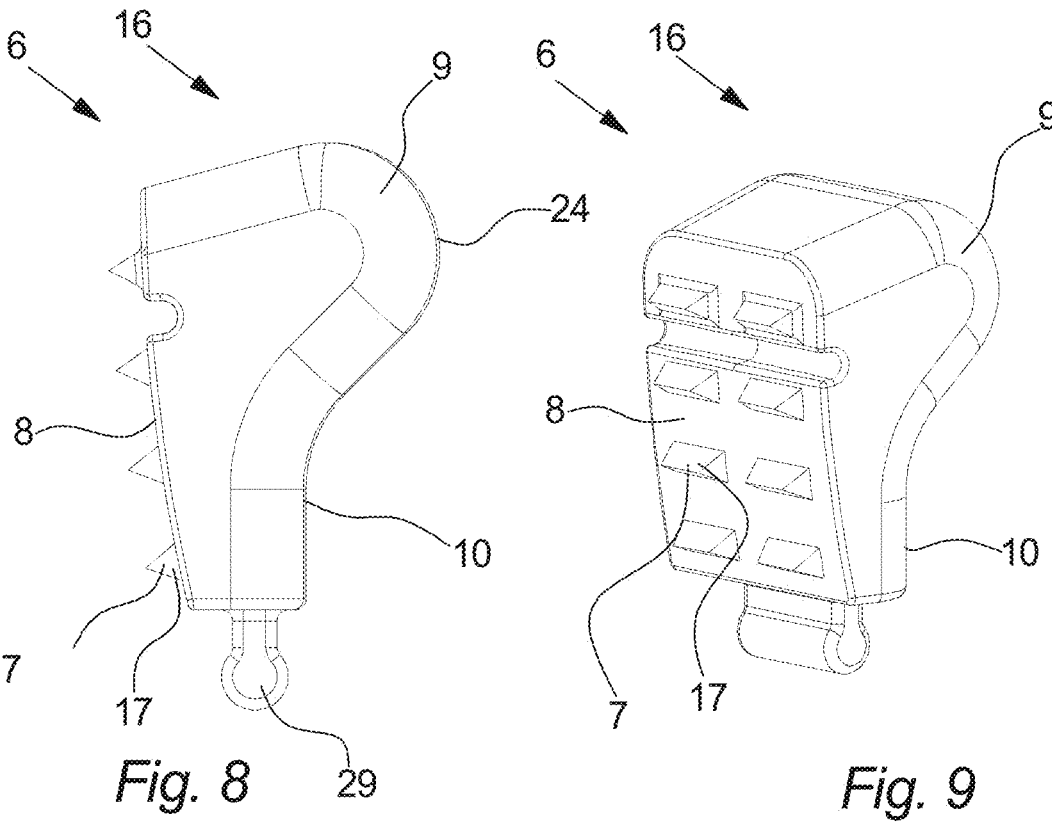
Fig. 8
Fig. 9

PIPE COUPLING FOR CONNECTING CIRCULAR ELEMENTS

TECHNICAL FIELD

The disclosure relates to a pipe coupling for connecting circular elements. The pipe coupling comprises a clamping ring and at least one fastening means arranged to contract the clamping ring.

BACKGROUND

Pipe couplings are used for connecting many kinds of circular element such as pipes, valve flanges, pumps, other pipe couplings or other to each other typically in some sort of a piping system such as at a waterworks, a water distribution system, an industrial plant or other. However, when e.g., a circular element in the form of a pipe is connected to another circular element in the form of a flange of a valve it can be difficult to securely fixate the regular pipe end to the valve flange without the inside fluid pressure pushing the pipe and the valve axially apart e.g., when the valve is closed, and the fluid pressure rises. Same problem occurs e.g., when two regular pipe end has to be connected.

Thus, from the European patent EP 2 905 522 B1 and the U.S. Pat. No. 7,837,239 B2 is known to form a pipe coupling by means of a clamping ring having an inner inclined surface against which wedge-shaped grip elements slide to provide a strong hold against a regular smooth and plane pipe surface. However, when this coupling design is used on weaker circular elements in the form of weaker pipe types such as plastic pipes, thinner metal pipes or composite pipes and the pipe is subjected to a pull away from the coupling, the wedging effect can be so forceful that the pipe is deformed to a degree where the wedge-shaped grip elements are pulled out of the pipe coupling and the pipe coupling is pulled apart.

The disclosure therefore to provides for a better pipe coupling design.

BRIEF SUMMARY

The disclosure provides for a pipe coupling for connecting circular elements. The pipe coupling comprises a clamping ring including an inner annular concave groove and at least one fastening means arranged to contract the clamping ring. The pipe coupling further comprises a plurality of grip elements each having a plurality of gripping protrusions on an inwards facing surface and a convex protrusion on an opposite outwards facing surface. The convex protrusion of the plurality of grip elements is arranged in the inner annular concave groove of the clamping ring so that the plurality of grip elements may tilt in relation to the clamping ring.

Forming the grip elements with convex protrusions on the backside and arranging these in an inner annular concave groove of the clamping ring enables that the grip elements may tilt—either by rotating in the concave groove or by rolling slightly on the concave groove surface—in the concave groove and exert more pressure on the outer surface of the circular element if the circular element is moved axially. Thus, the grip elements remain axially fixed or only move slightly in the axial direction when the circular element is pulled axially away from the pipe coupling and they thereby stay seated firmly in the concave groove hereby preventing that the grip elements are pulled out of the clamping ring even at a forceful axial pull in the circular element.

It should be emphasised that the term "circular elements" is to be understood as any kind of pipe, tube, circular flange—e.g. on a valve, a branching, a pump or other—or any other kind of equipment, fitting, device or other having a circular end part suited to be joined by a pipe coupling according to the present disclosure.

Furthermore, in this context the term "fastening means" is to be understood as any kind of fastener capable contracting the clamping ring. I.e., the term includes any kind of nut and bolt, screw, spindle, clamping device or other or any combination thereof.

In an aspect of the disclosure, the pipe coupling further comprises retainer means arranged to retain the convex protrusion of the plurality of grip elements in the inner annular concave groove of the clamping ring.

Providing the pipe coupling with retainer means arranged to keep the grip elements correctly positioned in the clamping ring is advantageous because it enables that the pipe coupling more easily may be mounted on a pipe and that the grip elements are maintained in place during handling, storage and other.

In this context the term "retainer means" is to be understood as any kind of retainer capable of maintaining the convex protrusion of the plurality of grip elements in the inner annular concave groove of the clamping ring. I.e., the term includes any kind of retainer ring, spring arrangement, fasteners or other.

In an aspect of the disclosure, the pipe coupling further comprises holding means arranged to maintain the plurality of grip elements in an initial position at least until the least one fastening means contract the clamping ring.

The pipe coupling comprises a plurality of grip elements and it is advantageous to use holding means to maintain all the grip elements in their correct initial position until the pipe coupling is in use in that this ensures easier mounting and better operation of the pipe coupling.

In this context the term "holding means" is to be understood as any kind of holder capable of maintaining the grip elements in an initial position until the pipe coupling is mounted on a pipe and the fastening means are tightened to contract the clamping ring. I.e., the term includes any kind of holding ring, spring arrangement, fasteners or other.

In an aspect of the disclosure, the clamping ring comprises two or more clamping ring parts.

Forming the clamping ring by means of two or more individual clamping ring parts—e.g., at least partly held together by fastening means, a tilt joint, a flexible member or other—is advantageous in that this makes it easier to mount the pipe coupling on the circular elements to be joined.

In an aspect of the disclosure, the plurality of grip elements comprises, a plurality of first grip elements having first gripping protrusions with a first contact area facing inwards. The plurality of grip elements further comprises a plurality of second grip elements having second gripping protrusions with a second contact area facing inwards, wherein the first contact area is greater than the second contact area.

When the pipe coupling is used on pipes made of plastic material and some types of composite material it is advantageous that the gripping protrusions engages as much of the pipe surface as possible to form a strong grip in that this material is softer. However, if the pipe coupling is used on pipes made of metal it is advantageous that the gripping protrusions are forced as deep into the pipe surface as possible to form a strong hold. Thus, it is advantageous to provide the pipe coupling with grip elements having gripping protrusions with different contact areas to ensure that the pipe coupling can be used to fixate pipes made of materials having different hardness.

In this context the term "contact area facing inwards" is to be understood as the innermost surface area of the gripping protrusions, i.e. the area making contact with a pipe arranged in the pipe coupling when the fastening means contract the clamping ring to make the gripping protrusions engage the outer pipe surface.

In an aspect of the disclosure, said inwards facing surface from which the second gripping protrusions of the plurality of the second grip elements protrudes is concave.

Forming the second grip surface—i.e. the surface from which the second gripping protrusions with the smaller contact area protrudes—concave is advantageous in that this will further reduce the contact area towards a pipe inserted in the pipe coupling and thereby increase the pressure on each of the second gripping protrusions engaging the pipe thereby increasing the chance of the second gripping protrusions deforming the surface of e.g. a metal pipe to ensure a firm grip.

In an aspect of the disclosure, the first gripping protrusions are made from a plastic material and wherein the second gripping protrusions are made from metal.

The surface of plastic pipes and some composite pipes are easy to penetrate by the gripping protrusions by due to the soft material the gripping protrusions will have to grip a plastic or composite pipe over a large area to ensure a strong hold. First gripping protrusions made from a plastic material are more flexible and adaptable to the circular surface of the pipe and it is therefore advantageous to form the first gripping protrusions are made from a plastic material it that these protrusions are better at gripping a plastic and some composite pipes. However, with metal pipe the object is to exert as much pressure over as little area as possible to ensure that the gripping protrusions deforms the outer surface of a metal pipe and engages the pipe firmly. Thus, it is advantageous to make the first gripping protrusions from a plastic material and make the second gripping protrusions from metal to ensure a stronger grip of both softer plastic pipes and harder metal, concrete, and composite pipes.

In an aspect of the disclosure, the inner annular concave groove and the plurality of grip elements are arranged at a first axial coupling end of the clamping ring for connecting the pipe coupling to a first circular pipe element of the circular elements, and wherein an inner annular gasket groove comprising a gasket is arranged at a second axial coupling end of the clamping ring for connecting the pipe coupling to a second circular pipe element of the circular elements.

Forming the pipe coupling with the grip elements at first axial coupling end of the clamping ring and a gasket arranged in an inner annular gasket groove at the second axial coupling end of the clamping ring is advantageous in that the pipe coupling hereby can be used for connecting a first circular pipe element in the form of a regular pipe to a second circular pipe element in the form of a different type of circular element than a pipe—such as a circular flange of a valve, a pump, a pipe of other thereby making the pipe coupling more versatile and making the pipe coupling fast to use in that both the first circular pipe element and the second circular pipe element can be connected contracting the clamping ring by means of the fastening means.

In an aspect of the disclosure, the plurality of grip elements has a longitudinal extent in the axial direction of the pipe coupling and wherein the convex protrusion is displaced from a middle of the grip elements in a direction towards the first axial coupling end.

Forming the pipe coupling with the convex protrusion of the grip elements closer to the first axial coupling end from which a pipe is inserted is advantageous in that when a mounted pipe is forced in a direction away from the pipe coupling the grip elements will tilt and the far end of the grip elements will be forced harder onto the pipe surface to ensure that the grip gets stronger the more the pipe is pushed or pulled away from the pipe coupling.

In an aspect of the disclosure, the concave groove is wider than the convex protrusion measured in the axial direction of the pipe coupling between an apex of the convex protrusion and a tilt axis of the grip elements.

Forming the concave groove wider than the convex protrusion is advantageous in that this reduces friction resistance between the concave groove and the convex protrusion and enables that the convex protrusion of grip elements may easier rock or roll on the inside surface of concave groove to ensure that the grip elements will tilt when the gripping protrusions are engaged in the outer surface of a circular element and the circular element is pushed or pulled away from the pipe coupling to further increase the grip.

BRIEF DESCRIPTION OF THE FIGURES

The disclosure will be described in the following with reference to the figures in which FIG. 6 illustrates a first grip element, as seen from the side, FIG. 7 illustrates a first grip element, as seen in an isometric view, FIG. 8 illustrates a second grip element, as seen from the side, and FIG. 9 illustrates a second grip element, as seen in an isometric view.

DETAILED DESCRIPTION

Figures 1, 2, 3:
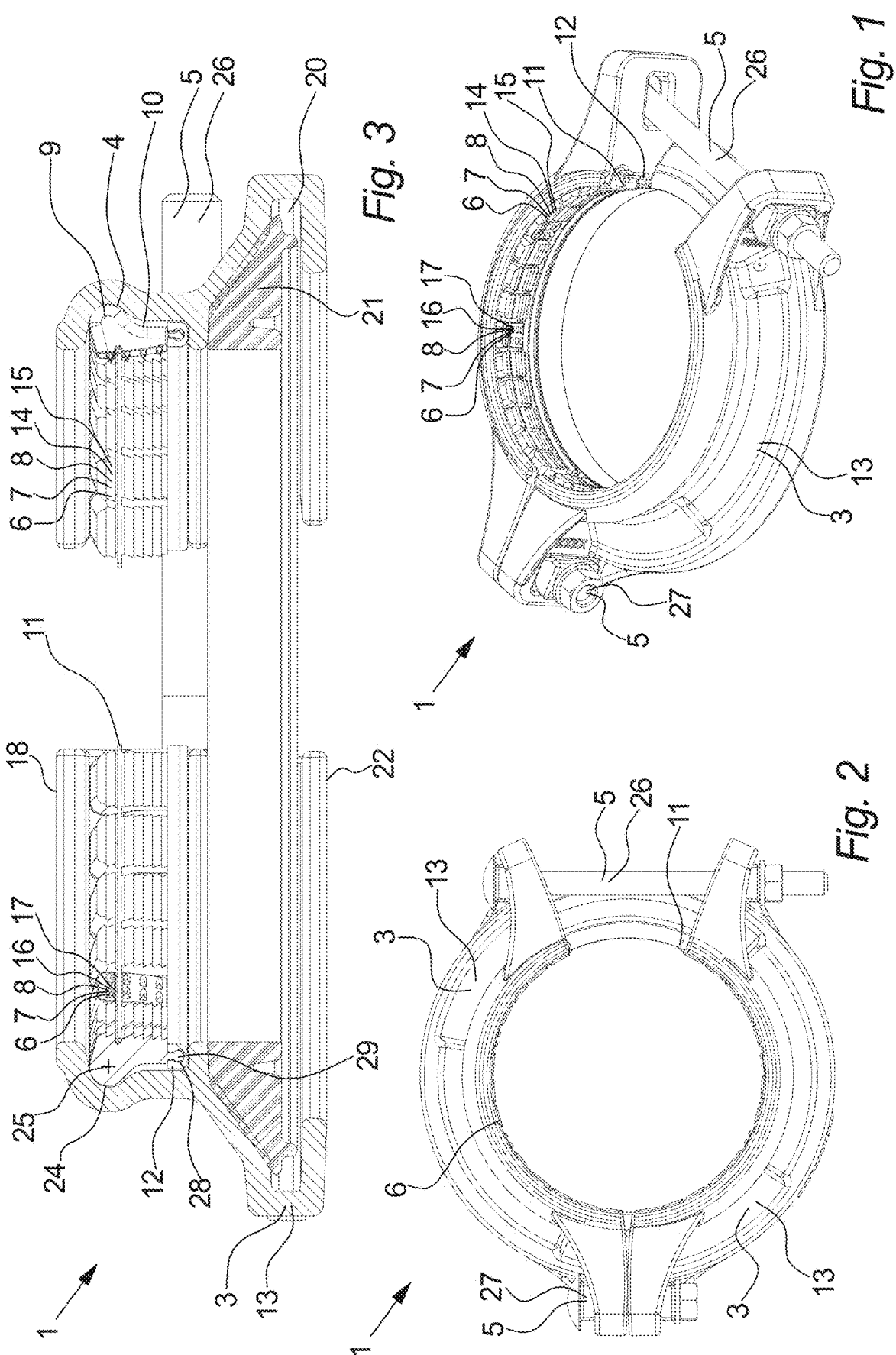
FIG. 1 illustrates a pipe coupling, as seen in an isometric view.
FIG. 2 illustrates a pipe coupling, as seen from the side.
FIG. 3 illustrates cross section through a pipe coupling, as seen from the bottom.

FIG. 1 illustrates a pipe coupling 1, as seen in an isometric view, FIG. 2 illustrates a pipe coupling 1, as seen from the side and FIG. 3 illustrates cross section through a pipe coupling 1, as seen from the bottom.

In this embodiment the pipe coupling 1 comprises a clamping ring 3, which in this embodiment is formed by two individual clamping ring parts 13 being held together by fastening means 5 in the form of a first set of bolt and nut 26 and a second set of bolt and nut 27. However, in another embodiment the clamping ring 3 could be formed by a single—flexible—clamping ring part 13 being contracted by a single fastening means 5 or the clamping ring 3 could comprise more than two clamping ring parts 13—such as three, four, six or even more. In this embodiment the first set of bolt and nut 26 is arranged to contract the clamping ring 3 when the pipe coupling 1 is mounted on the circular elements (not shown) to be connected so in another embodiment the second set of bolt and nut 27 could instead be a tilt joint, a flexible connecting member, interlocking geometry or other. In this embodiment the fastening means 5 in the form of the first set of bolt and nut 26 is capable of contracting the clamping ring 3 so much that the present embodiment of a pipe coupling 1 can be used for circular elements (not shown) in the form of regular pipes having a diameter from 159 mm to 180 mm. However, in another embodiment the diameter range could be greater or smaller depending on the design of the clamping ring 3 and/or the fastening means 5 and the pipe coupling could obviously be designed for smaller or greater pipe diameters.

In this embodiment the clamping ring 3 comprises an inner annular concave groove 4 extending the full extent of the claiming ring 3. In this embodiment a plurality of grip elements 6—each having a convex protrusion 9 on an outwards facing surface 10—are arranged so that the convex protrusion 9 are accommodated in the concave groove 4 so that the grip elements 6 may individually tilt in relation to said clamping ring 3. In this embodiment the plurality of grip elements 6 comprises gripping protrusions 7 on the inwards facing surface 8 to enable that the pipe coupling may grip a circular element (not shown) being inserted in the coupling 1. In this embodiment the plurality of grip elements 6 comprises twenty-four first grip elements 14 having first gripping protrusions 15 with a first contact area facing inwards and four second grip elements 16 having second gripping protrusions 17 with a second contact area facing inwards. However, in another embodiment the pipe coupling 1 could comprise more first grip elements 14 and/or the second grip elements 16 or less first grip elements 14 and/or the second grip elements 16, and/or the pipe coupling 1 could comprise more than two different types of grip elements 6 or the pipe coupling 1 could comprise only one type of grip elements 6. The first grip elements 14 and the second grip elements 16 will be discussed in more details in relation to FIGS. 6-9.

In this embodiment the pipe coupling 1 also comprises retainer means 11 in the form of a single open locking ring formed by a flexible spring-like metal wire arranged to force the grip elements 6 outwards to maintain the convex protrusion 9 correctly placed in the inner annular concave groove 4 of the clamping ring 3 by pushing on the inwards facing surface 8 of the grip elements 6. However, in another embodiment the retainer means 11 could comprise more than one locking ring and/or the retainer means 11 could also or instead comprise another spring arrangement, fasteners or other and/or the retainer means 11 could extend through at least some of the grip elements 6.

In this embodiment the pipe coupling 1 also comprises holding means 12 in the form of an open plastic ring having a holding groove 28 in which a holding protrusion 29 of each of the grip elements 6 is arranged to maintain the grip elements 6 in an initial position until the pipe coupling 1 is placed on a circular element (not shown) and the fastening means 5 contract the clamping ring 3. I.e. the holding means 12 ensures that the grip elements 6 does not tilt away from the initial position until the grip elements 6 has engages a surface of a circular element (not shown) inserted in the coupling 1 to thereby ensure correct function of the coupling 1 and easier mounting of the coupling 1. In this embodiment the holding means 12 is made of a plastic material to ensure that the holding means 12 may be deformed when the coupling 1 is in use, and the grip elements 6 will have to move away from their initial position/orientation. However, in another embodiment the holding means 12 could also or instead comprise an open locking ring, the holding means 12 could extend through the grip elements 6, the holding means

12 could be formed integrally with the claiming ring 3, the holding means 12 could be formed from another material such as metal, a composite material or other and/or the holding means 12 and the retainer means 11 could be formed as a single unit.

In this embodiment the concave groove 4 is formed as sector of a circle and the convex protrusion 9 is also formed as sector of a circle where the radius of the concave groove 4 is greater than the radius of the convex protrusion 9 making the concave groove 4 wider than the convex protrusion 9 measured in the axial direction of the pipe coupling 1 between the apex 24 of the convex protrusion 9 and a tilt axis 25 of the grip elements 6 which in this case is the center axis of the circular convex protrusion 9. However, in another embodiment the concave groove 4 and/or the convex protrusion 9 could be formed with another shape than sectors of a circle—such as sectors of a parabola, a hyperbola, a more complex curve or other or any combination thereof.

Figures 4, 5:
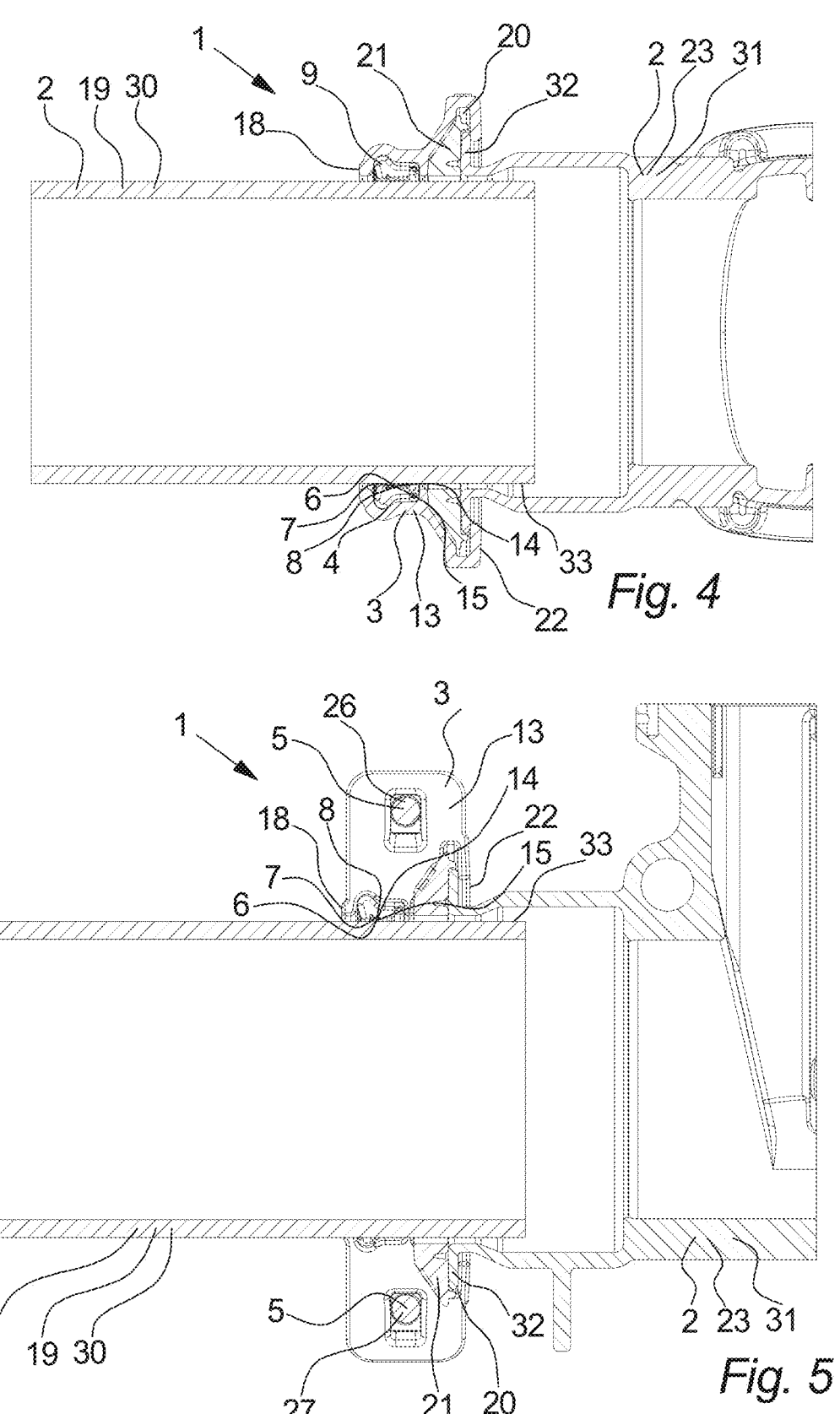
FIG. 4 illustrates a cross section through a pipe coupling connecting a pipe to a valve, as seen from the top.
FIG. 5 illustrates a cross section through a pipe coupling connecting a pipe to a valve, as seen from the side.

FIG. 4 illustrates a cross section through a pipe coupling 1 connecting a circular element 2 in the form of a pipe 30 to another circular element 2 in the form of a valve 31, as seen from the top and FIG. 5 illustrates a cross section through a pipe coupling 1 connecting the same circular elements 2, as seen from the side.

In the embodiments disclosed in FIGS. 1-5 the inner annular concave groove 4 and the plurality of grip elements 6 are arranged at a first axial coupling end 18 of the clamping ring 3 and in this embodiment a circular element 2 in the form of a first circular element 19 which in this case is a regular circular pipe 30 is connected to the coupling 1 by means of the grip elements 6. In this embodiment an inner annular gasket groove 20 comprising a gasket 21 is arranged at a second axial coupling end 22 of the clamping ring 3—i.e., in the end opposite the first axial coupling end 18—and a circular element 2 in the form of a second circular element 23 which in this case is a valve 31 is connected to the coupling 1 in that the circular end flange 32 of the valve 31 is locked in the inner annular gasket groove 20. However, in another embodiment the second axial coupling end 22 of the clamping ring 3 could also or instead be provided with a second inner annular concave groove holding a second plurality of grip elements, the second axial coupling end 22 could also or instead comprise a connection flange to which a circular end flange of a second circular element was bolted or the second axial coupling end 22 could also or instead comprise any number of other connection devices for connecting the second circular element 23 to the pipe coupling 1. Also, in another embodiment the second circular element 23 could be a pump, a filter, a pipe or any other device having a circular end part suited for being connected to the pipe coupling 1. In another embodiment the second circular element 23 could be a relatively short pipe having an circular end flanges at both ends so that the second axial coupling end 22 of the present pipe coupling 1 could be connected to either ends of this flanged pipe to form a device capable of connecting regular and substantially smooth circular pipes at both ends. If the end flanges of this short pipe had increased or decreased diameter at one end, different pipe couplings 1 having diameters could be used for forming a reducer by means of which regular pipes of different diameters could be connected to each other.

In this embodiment the method for connecting circular elements by means of the pipe coupling comprises the following steps:

place the pipe coupling 1 on a second circular element 23 so that the second circular element 23 is extending into the pipe coupling 1 from the second axial coupling end 22 of the clamping ring 3 and so that a circular end flange 32 of the second circular element 23 is arranged inside an inner annular gasket groove 20 located at the second axial coupling end 22 of the pipe coupling 1, place the pipe coupling 1 on the first circular element 19 so that the first circular element 19 is extending into the pipe coupling 1 from the first axial coupling end 18 of the clamping ring 3 and so that a regular end 33 of the first circular element 19 is extending at least into a gasket 21 also arranged in the inner annular gasket groove 20 at the second axial coupling end 22 of the clamping ring 3, and contracting the clamping ring 3 by means of fastening means 5 at least until the plurality of grip elements 6 arranged in the inner annular concave groove 4 at the first axial coupling end 18 of the clamping ring 3 engages the first circular element 19.

Once the pipe system is pressurized by a fluid—such as water—inside the system, the pressurized fluid will try to push the second circular element 23 and the first circular element 19 away from the pipe coupling 1 but if the first circular element 19 moves axially away from the coupling 1 the grip elements 6 will tilt and engage the first circular element 19 even further to increase the grip on the first circular element 19 and ensure that the first circular element 19 stays locked in the pipe coupling 1. And the gasket 21 in the inner annular gasket groove 20 will seal the connection between the first circular element 19 and the clamping ring 2 and between the second circular element 23 and the clamping ring 2 so that the pipe coupling is watertight during use.

In this embodiment the plurality of grip elements 6 has a longitudinal extent in the axial direction of pipe coupling 1 and in this embodiment, the convex protrusion 9—on the outer side of the grip elements 6—is displaced from the longitudinal middle of the grip elements 6 in a direction towards the first axial coupling end 18 so that if the first circular element 19 is attempted to be pushed or pulled out of the pipe coupling 1 in the longitudinal end of the grip elements 6 facing the second axial coupling end 22 will rotate at a larger diameter than if the convex protrusion 9 was located at the longitudinal middle of the grip elements 6—hereby ensuring that the pipe coupling can be used over a larger diameter range of the first circular element 19.

In this embodiment the convex protrusion 9 on the plurality of grip elements 6 is located at a first longitudinal end of the grip elements 6—i.e., the end of the grip elements 6 facing the first axial coupling end 18—enabling that the inner annular concave groove 4 of the clamping ring 3 may extent further down in front of the grip elements 6 at the coupling opening at the first axial coupling end 18 to ensure that the grip elements 6 are not pushed or pulled out of the pipe coupling 1.

FIG. 6 illustrates a first grip element 14, as seen from the side and FIG. 7 illustrates a first grip element 14, as seen in an isometric view.

A disclosed in relation to FIGS. 1-3 the pipe coupling 1 in this embodiment comprises both a plurality of first grip elements 14 and a plurality of second grip elements 16 (see FIGS. 8-9). In this embodiment the first grip element 14 is provided with first gripping protrusions 15 in the form of barb-like teeth extending all the way across the inwards facing surface 8 of the first grip element 14. I.e., because the entire inwards facing surface 8 of the first grip element 14 is provided with these teeth and because of number and width of these teeth the first gripping protrusions 15 of the first grip elements 14 has a relatively large first contact area when the first grip elements 14 are pressed inwards against an outer surface of a circular element.

Furthermore, in this embodiment the first grip elements 14 are entirely made of a plastic material making the teeth relatively soft and prone to engage the circular element over a larger area when first grip elements 14 are pressed against an outer surface of a circular element. I.e., in this embodiment the first grip elements 14 are particularly suited for engaging and firmly gripping softer types of circular elements—such as plastic pipes and some types of composite pipes. However, in another embodiment the first gripping protrusions 15 of the first grip elements 14 could be formed differently such as teeth of different sizes, teeth having an inner transversal curvature to increase the contact area towards a circular element, first gripping protrusions 15 formed as a plurality of cones or other and/or the first gripping protrusions 15 could be formed in another material such as metal, a composite material or other and/or the first gripping protrusions 15 could be formed in another material than the rest of the first grip elements 14.

FIG. 8 illustrates a second grip element 16, as seen from the side and FIG. 9 illustrates a second grip element 16, as seen in an isometric view.

In this embodiment the second grip element 16 is provided with second gripping protrusions 17 in the form of two rows of four triangular teeth. I.e., because the second grip element 16 in this embodiment only comprises eight relatively narrow teeth the second gripping protrusions 17 of the second grip elements 16 has a relatively little first contact area when the second grip elements 16 are pressed inwards against an outer surface of a circular element. Furthermore, in this embodiment the second grip elements 16 are entirely made of metal in the form of hardened steel making the teeth very hard and prone to pierce the surface of the circular element over a very little area when second grip elements 16 are pressed against an outer surface of a circular element. I.e., in this embodiment the second grip elements 16 are particularly suited for engaging and firmly gripping harder types of circular elements—such as metal pipes, concrete pipes, and some harder types of composite pipes. However, in another embodiment the second gripping protrusions 17 of the second grip elements 116 could be formed differently such as teeth of different sizes, teeth having an outwards transversal curvature to decrease the contact area towards a circular element, second gripping protrusions 17 formed as a plurality of cones or other and/or the second gripping protrusions 17 could be formed in another material such as ceramic, a composite material or other and/or the second gripping protrusions 17 could be formed in another material than the rest of the first grip elements 14.

In this embodiment the inwards facing surface 8 from which the second gripping protrusions 17 protrudes is slightly concave in the axial direction of the pipe coupling 1 ensuring that only a few teeth are engaging the circular element at a time to further reduce the second contact area of the second gripping protrusions 17.

Plastic material referred to throughout this document could be Polyvinylchloride (PVC), Polyethylene (PE), Polyamide (PA), or other types of plastic material suited for the specific purpose or any combination thereof.

The disclosure has been exemplified above with reference to specific examples of clamping rings 3, grip elements 6, gripping protrusions 7 and other. However, it should be understood that the disclosure is not limited to the particular examples described above but may be designed and altered in a multitude of varieties within the scope of the disclosure as specified in the claims.

The invention claimed is:

1. A pipe coupling for connecting circular elements, said pipe coupling comprising a clamping ring including an inner annular concave groove, at least one fastening means arranged to contract said clamping ring, and a plurality of grip elements each having a plurality of gripping protrusions on an inwards facing surface and a convex protrusion on an opposite outwards facing surface, wherein said convex protrusion of said plurality of grip elements is arranged in said inner annular concave groove of said clamping ring so that said plurality of grip elements may tilt in relation to said clamping ring;

wherein said inner annular concave groove and said plurality of grip elements are arranged at a first axial coupling end of said clamping ring for connecting said pipe coupling to a first circular element of said circular elements, and wherein an inner annular gasket groove comprising a gasket is arranged at a second axial coupling end of said clamping ring for connecting said pipe coupling to a second circular element of said circular elements.

2. The pipe coupling according to claim 1, wherein said pipe coupling further comprises retainer means arranged to retain said convex protrusion of said plurality of grip elements in said inner annular concave groove of said clamping ring.

3. The pipe coupling according to claim 1, wherein said pipe coupling further comprises holding means arranged to maintain said plurality of grip elements in an initial position at least until said least one fastening means contract said clamping ring.

4. The pipe coupling according to claim 1, wherein said clamping ring comprises two or more clamping ring parts.

5. The pipe coupling according to claim 1, wherein said plurality of grip elements comprises, a plurality of first grip elements having first gripping protrusions with a first contact area facing inwards, and a plurality of second grip elements having second gripping protrusions with a second contact area facing inwards, wherein said first contact area is greater than said second contact area.

6. The pipe coupling according to claim 5, wherein said inwards facing surface, from which said second gripping protrusions of said plurality of the second grip elements protrudes, is concave.

7. The pipe coupling according to claim 5, wherein said first gripping protrusions are made from a plastic material and wherein said second gripping protrusions are made from metal.

8. The pipe coupling according to claim 1, wherein said plurality of grip elements has a longitudinal extent in the axial direction of said pipe coupling and wherein said convex protrusion is displaced from a middle of said grip elements in a direction towards said first axial coupling end.

9. The pipe coupling according to claim 1, wherein said concave groove is wider than said convex protrusion measured in the axial direction of said pipe coupling between an apex of said convex protrusion and a tilt axis of said grip elements.

* * * * *